(12) United States Patent
Tsukada et al.

(10) Patent No.: US 6,174,511 B1
(45) Date of Patent: Jan. 16, 2001

(54) PSEUDOBOEHMITE POWDER FOR CATALYST CARRIER AND PROCESS FOR PREPARING THE SAME

(75) Inventors: Takayuki Tsukada; Hiroyuki Nakamura, both of Toda (JP)

(73) Assignee: Japan Energy Corporation, Tokyo (JP)

( * ) Notice: Under 35 U.S.C. 154(b), the term of this patent shall be extended for 0 days.

(21) Appl. No.: 09/254,658

(22) PCT Filed: Jul. 15, 1998

(86) PCT No.: PCT/JP98/03174

§ 371 Date: May 6, 1999

§ 102(e) Date: May 6, 1999

(87) PCT Pub. No.: WO99/03783

PCT Pub. Date: Jan. 28, 1999

(30) Foreign Application Priority Data

Jul. 15, 1997 (JP) .................................................. 9-203914

(51) Int. Cl.[7] .................. C01F 7/02; B01J 21/00
(52) U.S. Cl. .............................. 423/628; 502/355
(58) Field of Search ............................ 423/628; 502/439, 502/355

(56) References Cited

U.S. PATENT DOCUMENTS

| | | | |
|---|---|---|---|
| 3,864,461 | * | 2/1975 | Miller et al. ........................ 423/628 |
| 4,248,852 | * | 2/1981 | Wakabayashi ........................ 423/628 |
| 4,313,923 | * | 2/1982 | Block et al. ........................ 423/628 |
| 4,613,585 | * | 9/1986 | Takumi et al. ........................ 423/628 |
| 5,089,247 | * | 2/1992 | Liu et al. ........................ 423/628 |

FOREIGN PATENT DOCUMENTS

| | | |
|---|---|---|
| 58-190823 | 11/1983 | (JP) . |
| 6-8174 | 2/1994 | (JP) . |
| 8-10627 | 1/1996 | (JP) . |
| 8-268716 | 10/1996 | (JP) . |

OTHER PUBLICATIONS

"The Determination of Pore Volume and Area Distributions in Porous Substances. I. Computations from Nitrogen Isotherms", Elliott P. Barrett et al., Journal of the American Chemical Society, 73, 373 (1951).

* cited by examiner

Primary Examiner—Steven Bos
(74) Attorney, Agent, or Firm—Birch, Stewart, Kolasch & Birch, LLP

(57) ABSTRACT

An aluminum salt solution and an alkali aluminate solution are subjected to a neutralization reaction to precipitate and form a pseudo-boehmite powder. The neutralization reaction is performed under a condition in which the reaction temperature is within a range of 55 to 71° C., pH is within a range of 8.5 to 9.5, and the solution feed time is within a range of 7 to 25 minutes. The obtained pseudo-boehmite is as follows. That is, the pore volume concerning pores having a pore diameter ranging from 20 to 600 Å is within a range of 0.8 to 1.8 cc/g as measured by the nitrogen adsorption method, and the maximum value of variation ratio $dV/dD$ of the pore volume with respect to the pore diameter as measured by the BJH method is not more than 0.018 cc/g·Å. When the pseudo-boehmite is used, it is possible to produce a catalyst carrier for hydrogenation refining, which has a sharp pore diameter distribution and which suffers less decrease in strength upon impregnation with a catalyst solution.

11 Claims, 12 Drawing Sheets

Fig. 1

Table 1

PORE VOLUME OF POWDER OBTAINED IN WORKING EXAMPLE AND REFERENCE EXAMPLE AND MAXIMUM VALUE OF VARIATION RATIO OF PORE VOLUME WITH RESPECT TO PORE DIAMETER

|  | Working Example | | |
|---|---|---|---|
|  | 1 | 2 | 3 |
| Temperature (°C) | 57 | 65 | 70 |
| pH | 9.0 | 9.0 | 9.0 |
| Precipitate formation time (minute) | 17 | 17 | 10 |
| Pore volume of 20 to 600 Å (cc/g) | 0.95 | 0.88 | 0.79 |
| Maximum value of dV/dD* (cc/g·Å) | 0.013 | 0.018 | 0.016 |

*: VARIATION RATIO OF PORE VOLUME WITH RESPECT TO PORE DIAMETER.

Fig. 2

Table 2

| | Reference Example | | Working Example | | | Reference Example | |
|---|---|---|---|---|---|---|---|
| | 1 | 2 | 4 | 5 | 6 | 3 | 4 |
| Temperature (°C) | 57 | 57 | 57 | 57 | 57 | 57 | 57 |
| pH | 9.0 | 9.0 | 9.0 | 9.0 | 9.0 | 9.0 | 9.0 |
| Precipitate formation time (minute) | 5 | 10 | 15 | 20 | 25 | 30 | 35 |
| Pore volume of 20 to 600 Å (cc/g) | 0.24 | 0.48 | 1.01 | 0.95 | 0.81 | 0.73 | 0.71 |
| Maximum value of dV/dD (cc/g·Å) | 0.009 | 0.012 | 0.013 | 0.014 | 0.018 | 0.028 | 0.036 |

Fig. 3

Table 3

|  | Reference Example | Working Example | | | Reference Example |
|---|---|---|---|---|---|
|  | 5 | 7 | 8 | 9 | 6 |
| Temperature (°C) | 65 | 65 | 65 | 65 | 65 |
| pH | 9.0 | 9.0 | 9.0 | 9.0 | 9.0 |
| Precipitate formation time (minute) | 5 | 10 | 15 | 20 | 25 |
| Pore volume of 20 to 600 Å (cc/g) | 0.34 | 0.79 | 0.83 | 0.80 | 0.74 |
| Maximum value of dV/dD (cc/g·Å) | 0.019 | 0.012 | 0.016 | 0.017 | 0.020 |

Fig. 4

Table 4

| | Reference Example 7 | Working Example | | | Reference Example 8 |
|---|---|---|---|---|---|
| | | 10 | 11 | 12 | |
| Temperature (°C) | 70 | 70 | 70 | 70 | 70 |
| pH | 9.0 | 9.0 | 9.0 | 9.0 | 9.0 |
| Precipitate formation time (minute) | 5 | 7 | 10 | 15 | 20 |
| Pore volume of 20 to 600 Å (cc/g) | 0.43 | 0.75 | 0.79 | 0.75 | 0.72 |
| Maximum value of dV/dD (cc/g•Å) | 0.006 | 0.015 | 0.016 | 0.018 | 0.020 |

Fig. 5

Table 5

| | Reference Example | | | | |
|---|---|---|---|---|---|
| | 9 | 10 | 11 | 12 | |
| Temperature (°C) | 53 | 72 | 57 | 57 | |
| pH | 9.0 | 9.0 | 8.0 | 9.7 | |
| Precipitate formation time (minute) | 20 | 10 | 20 | 20 | |
| Pore volume of 20 to 600 Å (cc/g) | 0.51 | 0.68 | 0.34 | 0.72 | |
| Maximum value of dV/dD (cc/g·Å) | 0.012 | 0.027 | 0.007 | 0.030 | |

Fig. 6

Table 6

PORE VOLUME OF CARRIER OBTAINED IN WORKING EXAMPLE AND REFERENCE EXAMPLE

|  | Working Example | | |
|---|---|---|---|
|  | 1 | 2 | 3 |
| Central pore diameter (Å) | 95 | 97 | 98 |
| Pore volume of 20 to 600 Å (cc/g) | 0.74 | 0.73 | 0.75 |
| Pore volume of 85 to 120 Å (cc/g) | 0.39 | 0.38 | 0.40 |
| Water stability* | 30 | 30 | 30 |

*: NUMBER OF INDIVIDUALS NOT CRACKED WHEN 30 PELLETS WERE IMMERSED IN WATER.

Fig. 7

Table 7

| | Reference Example | | Working Example | | | | Reference Example | |
|---|---|---|---|---|---|---|---|---|
| | 1 | 2 | 4 | 5 | 6 | 3 | 4 |
| Central pore diameter (Å) | 72 | 75 | 78 | 82 | 83 | 80 | 79 |
| Pore volume of 20 to 600 Å (cc/g) | 0.35 | 0.50 | 0.76 | 0.73 | 0.74 | 0.70 | 0.68 |
| Pore volume of 60 to 90 Å (cc/g) | 0.10 | 0.18 | 0.45 | 0.42 | 0.36 | 0.29 | 0.28 |
| Water stability | 14 | 15 | 30 | 30 | 30 | 30 | 30 |

Fig. 8

Table 8

| | Reference Example 5 | Working Example | | | Reference Example 6 |
| --- | --- | --- | --- | --- | --- |
| | | 7 | 8 | 9 | |
| Central pore diameter (Å) | 75 | 84 | 78 | 80 | 82 |
| Pore volume of 20 to 600 Å (cc/g) | 0.43 | 0.76 | 0.77 | 0.74 | 0.65 |
| Pore volume of 60 to 90 Å (cc/g) | 0.15 | 0.45 | 0.46 | 0.38 | 0.29 |
| Water stability | 14 | 30 | 30 | 30 | 30 |

Fig. 9

Table 9

|  | Reference Example 7 | Working Example | | | Reference Example 8 |
|---|---|---|---|---|---|
|  |  | 10 | 11 | 12 |  |
| Central pore diameter (Å) | 85 | 82 | 77 | 79 | 80 |
| Pore volume of 20 to 600 Å (cc/g) | 0.57 | 0.70 | 0.71 | 0.70 | 0.63 |
| Pore volume of 60 to 90 Å (cc/g) | 0.28 | 0.35 | 0.34 | 0.33 | 0.28 |
| Water stability | 17 | 30 | 30 | 30 | 30 |

Fig. 10

Table 10

| | Reference Example | | | |
|---|---|---|---|---|
| | 9 | 10 | 11 | 12 |
| Central pore diameter (Å) | 75 | 83 | 81 | 78 |
| Pore volume of 20 to 600 Å (cc/g) | 0.52 | 0.66 | 0.45 | 0.69 |
| Pore volume of 60 to 90 Å (cc/g) | 0.19 | 0.28 | 0.15 | 0.29 |
| Water stability | 25 | 30 | 13 | 30 |

PSEUDOBOEHMITE POWDER FOR CATALYST CARRIER AND PROCESS FOR PREPARING THE SAME

This application is the national phase under 35 U.S.C. §371 of prior PCT International Application No. PCT/JP98/03174 which has an International filing date of Jul. 15, 1998 which designated the United States of America.

TECHNICAL FIELD

The present invention relates to a pseudo-boehmite raw material powder to be used for producing a catalyst carrier for hydrogenation refining, and a method for producing the same. In particular, the present invention relates to a pseudo-boehmite raw material powder to be used for producing a catalyst carrier which has a sharp pore diameter distribution and which makes it possible to avoid decrease in strength during the impregnating step with a catalyst metal salt solution. The present invention also relates to a method for producing the pseudo-boehmite raw material powder, and the catalyst carrier for a hydrogenation refining catalyst produced by using the powder.

BACKGROUND ART

The catalyst, which is used for hydrogenation refining, is typically prepared by allowing a porous alumina carrier to carry an active metal belonging to the group VIa and the group VIII of the periodic table. It is necessary for such an alumina carrier to have a large surface area in order to uniformly disperse the active metal. For this purpose, it is desirable to possess a large volume of the pore called "mesopore" having a diameter in a range from several tens to several hundreds of angstroms. On the other hand, it is also required to possess a specified size of pore diameter in order that a reactant arrives at an active surface at the inside of the catalyst pore, and a reaction product is released therefrom. In order to satisfy the request as described above, it is important that not only the pore diameter but also the pore diameter distribution is adjusted in conformity with the reactant.

For example, when the atmospheric residual oil or the vacuum gas oil is decomposed and processed with a catalyst, then the oil having a large molecular weight is decomposed during the decomposition reaction, and the pore of the catalyst (catalyst carrier) is closed. As a result, the activity of the catalyst is lowered. Therefore, when the atmospheric residual oil or the vacuum gas oil is processed as described above, it is necessary to use a catalyst carrier which has a sharp pore diameter distribution having a peak within a specified pore diameter range corresponding to the molecular weight of the oil to be processed and which has a large total pore volume concerning pores belonging to the specified pore diameter range.

It has been hitherto revealed that when the catalyst for hydrogenation refining is produced, the catalytic activity can be maintained for a long period of time by selecting the pore diameter distribution of the catalyst carrier while considering, for example, the type of the raw material oil, the reaction condition, and the catalyst particle diameter. Those known as the method for adjusting the pore diameter distribution include, for example, a method in which an alumina raw material power is added with an additive such as a fine powder of a water-insoluble organic polymer, a water-soluble organic solvent such as alcohol, carboxylic acid, and ketone, and a surface active agent such as higher alcohol and higher alkylamine. After the fine powdery fire-resistant inorganic oxide or hydroxide is formed, the additive is removed by means of the drying and calcining treatment. Another method has been also suggested, in which the pore diameter distribution of the catalyst carrier is adjusted by treating the formed, dried, or calcined carrier or catalyst, for example, with hot water, acid, aqueous solution of metal salt, or steam.

However, even when the method as described above is used, it is difficult to obtain the catalyst carrier having the pore diameter distribution which is most suitable, for example, for the application or use such as the treatment for the atmospheric residual oil or the vacuum gas oil. Further, there has been a problem that the catalytic activity of the obtained catalyst cannot be maintained for a long period of time.

The following method is adopted when the alumina carrier is produced. That is, a peptizing agent such as acid or alkali is added to a pseudo-boehmite powder followed by mixing and kneading to form a pellet which is then dried and calcined. A technique concerning this method is known, in which the calcination condition such as temperature is changed when the formed pseudo-boehmite powder is calcined, in order to regulate the pore diameter of the alumina carrier. However, the final pore diameter distribution of the carrier is substantially determined by the pore diameter distributions of the raw material pseudo-boehmite powder and the formed product after the mixing and kneading. Therefore, it is difficult to perform the control so that the pore volume of pores belonging to those having a specified pore diameter range is increased merely by changing the calcination temperature and the calcination atmosphere.

It is assumed that the step other than the calcination step, which makes it possible to regulate the pore diameter distribution, is the mixing and kneading step for the pseudo-boehmite powder. In order to obtain the pore diameter distribution having a large pore volume concerning a specified pore diameter by means of the mixing and kneading process, important factors are the peptizing property of the powder and the size of the primary and secondary particles of the pseudo-boehmite powder. Some pseudo-boehmite powders are inferior in peptizing property, and they cannot be peptized with acid or alkali, resulting in an alumina carrier having a broad pore diameter distribution. Therefore, in order to obtain an alumina carrier having a sharp pore diameter distribution, it is necessary to use a pseudo-boehmite powder having excellent peptizing property.

Japanese Patent Publication No. 6-8174 discloses a method for producing a pseudo-boehmite, in which a solution of alkali aluminate is added to an aqueous solution of mineral acid salt of aluminum in the presence of hydroxycarboxylic acid to obtain a slurry to which an aqueous solution of mineral acid salt of aluminum and a solution of alkali aluminate are then simultaneously added so that precipitate of aluminum hydroxide is produced in two stages in a separated manner. It is reported in this patent document that an obtained pseudo-boehmite powder is excellent in peptizing property, and an alumina carrier having a sharp pore diameter distribution can be produced by using the obtained pseudo-boehmite powder as a material for producing the catalyst carrier. However, as disclosed in Japanese Patent Application Laid-Open No. 8-10627, a carrier having a sharp pore diameter distribution, which is produced from a pseudo-boehmite powder having an excellent peptizing property, is inferior in water stability. As a result, a new problem arises in that the strength is lowered during the step of impregnation with a catalyst metal solution.

An object of the present invention is to provide a pseudo-boehmite powder to be used to produce an alumina catalyst carrier which has a sharp pore diameter distribution so as to increase the pore volume concerning a pore diameter of 60 to 120 Å, especially within a specified pore diameter range within this range, and which undergoes less decrease in strength when the carrier is impregnated with a catalyst metal salt solution. Another object of the present invention is to provide a catalyst carrier for hydrogenation refining, based on the use of the pseudo-boehmite powder as a raw material powder, the catalyst carrier being preferably used for the hydrogenation refining process such as the desulfurization process and/or the denitrification process for a petroleum fraction within a specified boiling point range.

DISCLOSURE OF THE INVENTION

As a result of the investigation by the present inventors concerning the pore diameter distribution of the pseudo-boehmite powder, it has been revealed that a catalyst carrier for hydrogenation desulfurization, which has a sharp pore diameter distribution corresponding to a boiling point range of a desired petroleum fraction, can be easily produced by using, as a raw material powder, a pseudo-boehmite powder which has a large pore volume but which has a broad pore diameter distribution. This discovery explodes such a common sense in this field of the art that a pseudo-boehmite powder having a sharp pore diameter distribution is used in order to obtain a carrier having a sharp pore diameter distribution, and it may be extremely useful to develop the technique for producing the catalyst carrier in future.

According to a first aspect of the present invention, there is provided a method for producing a pseudo-boehmite powder for a catalyst carrier, comprising the step of effecting a neutralization reaction of a solution of aluminum salt and a solution of alkali aluminate, characterized in that pseudo-boehmite is precipitated by the neutralization reaction in which a reaction temperature is within a range of 55 to 71° C., preferably 57 to 70° C., pH is within a range of 8.5 to 9.5, and a solution feed time is within a range of 6 to 28 minutes, preferably 7 to 25 minutes. By using the method of the present invention, it is possible to obtain the pseudo-boehmite powder which has i) a large pore volume such that the pore volume is 0.75 to 1.8 cc/g within a range of the pore diameter of 20 to 600 Å as measured by the nitrogen adsorption method, and which has ii) a broad pore diameter distribution such that the maximum value of variation ratio of the pore volume with respect to the pore diameter is not more than 0.018 cc/g•Å. When the pseudo-boehmite powder having the characteristics i) and ii) is used as a raw material powder, it is possible to extremely easily produce a catalyst carrier for hydrogenation refining, having a pore diameter distribution in which a large pore volume is possessed by pores belonging to a pore diameter range of 60 to 120 Å, especially a specified pore diameter ranged within the foregoing range, for example, a pore diameter range of 60 to 90 Å or a pore diameter range of 85 to 120 Å.

In the production method according to the present invention, it is preferable to use an aluminum sulfate solution or a sodium aluminate solution, as the aluminum salt solution and the alkali aluminate solution respectively. In particular, it is preferable that the solution feed time is 6 to 28 minutes, especially 12 to 25 minutes at about 57° C., 10 to 20 minutes at about 65° C., and 7 to 15 minutes at about 70° C. In this specification, the term "solution feed time" means the period of time from the point of time at which the aluminum salt solution and the alkali aluminate solution are fed to a reaction vessel to make a start, until the completion of the solution feed.

According to a second aspect of the present invention, there is provided a pseudo-boehmite powder for a catalyst carrier, the pseudo-boehmite powder being a material for producing the catalyst carrier for hydrogenation refining, wherein pores each having a pore diameter ranging from 20 to 600 Å have a pore volume within a range of 0.75 to 1.8 cc/g as measured by the nitrogen adsorption method, and a maximum value of variation ratio of the pore volume with respect to the pore diameter is not more than 0.018 cc/g•Å. As described above, when the pseudo-boehmite powder having this nature is used, it is possible to extremely easily produce the catalyst carrier for hydrogenation refining which is excellent in water stability and which has a pore diameter distribution in which the pore volume is large concerning those having the pore diameter of 60 to 120 Å.

In this specification, the term "pore diameter distribution" is measured by the nitrogen ($N_2$) adsorption method, and it is determined on the basis of the BJH method. The nitrogen adsorption method is a method well-known in the field of the art, in which the pore volume of the porous body is measured by adsorbing nitrogen to the pores. This method includes a type in which the pore volume is determined during the adsorption, and a type in which the pore volume is determined during the release. However, the latter type is generally used. When the nitrogen adsorption method is referred to in this specification, it is intended to mean the result obtained by the measurement performed when nitrogen is released.

The BJH method is a technique in which an adsorption isothermal line or a release isothermal line is determined from an amount of adsorption of nitrogen adsorbed to the pores under a relative pressure of nitrogen applied when (liquid) nitrogen is adsorbed to a porous body or it is released therefrom by using the nitrogen adsorption method, and the pore distribution or the like is determined therefrom. This technique is also known in the field of the art, details of which is disclosed, for example, in Journal of the American Chemical Society, vol. 73, p. 373 (1951) written by E. P. Barrett, L. G. Joyner, and P. P. Halenda. The disclosure of this document is incorporated herein by reference provided that laws and practices of the designated countries designated by this international application allow the incorporation.

In the BJH method, the relative pressure of nitrogen P/Po=(vapor pressure of nitrogen gas)/(saturated vapor pressure of nitrogen gas at cooled temperature) is applied at various pressures to the porous body as a sample to calculate the nitrogen adsorption volume concerning the pore diameter of the porous body determined by each of the relative pressures. In order to correctly determine the nitrogen adsorption volume concerning various pore diameters, i.e., the pore diameter distribution, it is preferable that the values of pore diameters sampled within a predetermined pore diameter range, i.e., a plurality of relative pressures as targets are equally separated from each other, and the number of them is large. In this specification, when the pore diameter distribution is determined by using the BJH method, sampling is performed preferably at substantially equal intervals at eight points or more within a pore diameter range of 20 to 100 Å. This definition makes it possible to relatively correctly determine the pore diameter distribution, especially the variation ratio concerning the pore volume with respect to the pore diameter.

In an embodiment of the present invention, the pore diameter distribution is determined by means of the measurement upon the release by using targets of relative pressures of 0.9902, 0.9802, 0.9751, 0.9665, 0.9596, 0.9549, 0.9491, 0.9416, 0.9314, 0.9263, 0.9205, 0.9136, 0.9054, 0.8956, 0.8835, 0.8684, 0.8593, 0.8490, 0.8371, 0.8233, 0.8070, 0.7876, 0.7642, 0.7354, 0.6903, 0.6532, 0.5929, 0.4618, 0.3359, 0.2000, 0.1200, and 0.0550. The measurement is performed for the range of 20 to 600 Å as the range of the pore diameter within the range of the relative pressure as described above. The catalyst carrier having the sharp pore diameter distribution, which is preferable for the catalyst for hydrogenation refining, can be produced by mixing, kneading, forming, and calcining the pseudo-boehmite powder having the pore diameter distribution as described above.

According to a third aspect of the present invention, there is provided an alumina catalyst carrier for hydrogenation refining, which is produced by using the pseudo-boehmite powder of the present invention described above. In order to use the alumina catalyst carrier for hydrogenation refining as a catalyst carrier to be used for the purpose of desulfurization and denitrification for a fraction having a boiling point of 200 to 360° C. such as vacuum gas oil in the petroleum fraction, it is desirable that the volume average pore diameter is, for example, 60 to 120 Å, the pore volume of pores having the pore diameter of 20 to 600 Å is 0.3 to 1.0 cc/g, and the pore volume of pores within a pore diameter range of 60 to 90 Å is 0.3 to 0.7 cc/g. In order to use the alumina catalyst carrier for hydrogenation refining as a catalyst carrier preferable for the purpose of desulfurization for a petroleum fraction having a 50% distillation temperature of not less than 450° C. such as atmospheric residual oil, it is desirable that the average pore diameter is, for example, 60 to 120 Å, the pore volume of pores having the pore diameter of not more than 20 to 600 Å is 0.3 to 1.0 cc/g, and the pore volume of pores within a pore diameter range of 85 to 120 Å is 0.3 to 0.7 cc/g.

BRIEF DESCRIPTION OF THE DRAWINGS

FIG. 1 shows a table (Table 1) illustrating, together with the neutralization reaction condition, the pore volume concerning the pore diameter of 20 to 600 Å of the pseudo-boehmites produced in Working Examples 1 to 3, and the maximum values of the variation ratio of the pore volume with respect to the pore diameter.

FIG. 2 shows a table (Table 2) illustrating, together with the neutralization reaction condition, the pore volume concerning the pore diameter of 20 to 600 Å of the pseudo-boehmites produced in Working Examples 4 to 6 and Reference Examples 1 to 4, and the maximum values of the variation ratio of the pore volume with respect to the pore diameter, wherein the reaction temperature is 57° C.

FIG. 3 shows a table (Table 3) illustrating, together with the neutralization reaction condition, the pore volume concerning the pore diameter of 20 to 600 Å of the pseudo-boehmites produced in Working Examples 7 to 9 and Reference Examples 5 and 6, and the maximum values of the variation ratio of the pore volume with respect to the pore diameter, wherein the reaction temperature is 65° C.

FIG. 4 shows a table (Table 4) illustrating, together with the neutralization reaction condition, the pore volume concerning the pore diameter of 20 to 600 Å of the pseudo-boehmites produced in Working Examples 10 to 12 and Reference Examples 7 and 8, and the maximum values of the variation ratio of the pore volume with respect to the pore diameter, wherein the reaction temperature is 70° C.

FIG. 5 shows a table (Table 5) illustrating, together with the neutralization reaction condition, the pore volume concerning the pore diameter of 20 to 600 Å of the pseudo-boehmites produced in Reference Examples 9 to 12, and the maximum values of the variation ratio of the pore volume with respect to the pore diameter.

FIG. 6 shows a table (Table 6) illustrating the pore volume concerning the pore diameter of 20 to 600 Å and the pore volume concerning the pore diameter of 85 to 120 Å of the alumina carriers produced by using the pseudo-boehmites obtained in Working Examples 1 to 3, and the result of the water stability test.

FIG. 7 shows a table (Table 7) illustrating the pore volume concerning the pore diameter of 20 to 600 Å and the pore volume concerning the pore diameter of 60 to 90 Å of the alumina carriers produced by using the pseudo-boehmites obtained in Working Examples 4 to 6 and Reference Examples 1 to 4, and the result of the water stability test.

FIG. 8 shows a table (Table 8) illustrating the pore volume concerning the pore diameter of 20 to 600 Å and the pore volume concerning the pore diameter of 60 to 90 Å of the alumina carriers produced by using the pseudo-boehmites obtained in Working Examples 7 to 9 and Reference Examples 5 and 6, and the result of the water stability test.

FIG. 9 shows a table (Table 9) illustrating the pore volume concerning the pore diameter of 20 to 600 Å and the pore volume concerning the pore diameter of 60 to 90 Å of the alumina carriers produced by using the pseudo-boehmites obtained in Working Examples 10 to 12 and Reference Examples 7 and 8, and the result of the water stability test.

FIG. 10 shows a table (Table 10) illustrating the pore volume concerning the pore diameter of 20 to 600 Å and the pore volume concerning the pore diameter of 60 to 90 Å of the alumina carriers produced by using the pseudo-boehmites obtained in Reference Examples 9 to 12.

BEST MODE FOR CARRYING OUT THE INVENTION

Figure 11:
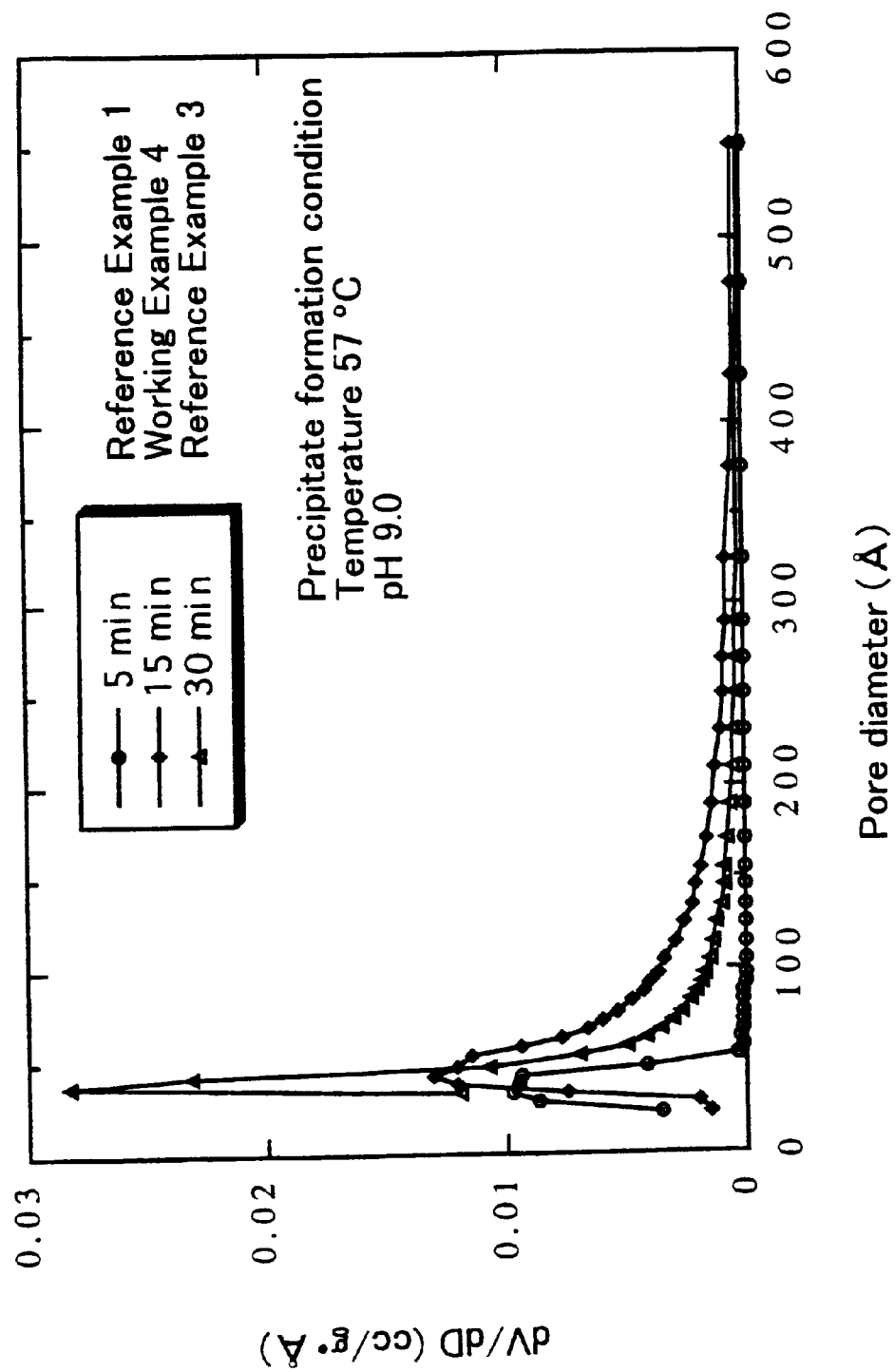
FIG. 11 shows a graph illustrating the pore diameter distributions of the pseudo-boehmite powders obtained in Working Example 4 and Reference Examples 1 and 3.

The pseudo-boehmite powder of the present invention can be produced by means of the neutralization reaction of the aluminum salt solution and the alkali aluminate solution. Those usable as the aluminum salt include a variety of arbitrary aluminum salts such as aluminum sulfate, aluminum chloride, and aluminum nitrate. Especially, aluminum sulfate and aluminum chloride are preferred because they are cheap in price. The aluminum salt may be used alone or in combination of two or more aluminum salts. Those usable as the alkali aluminate include arbitrary alkali aluminate such as sodium aluminate and potassium aluminate. Sodium aluminate is preferred because it is easily obtainable and cheap in price. The alkali aluminate may be also used alone or in combination of two or more alkali aluminates.

The following condition is preferable for the neutralization reaction for forming the precipitate. That is, the temperature of the neutralization solution (reaction temperature) in the reaction vessel is adjusted to be 55 to 71° C., and pH is adjusted to be 8.5 to 9.5. If the temperature of the neutralization solution is less than 55° C., precipitated particles tightly coagulate with each other, resulting in a small pore volume of the powder obtained after performing the aging and drying steps, which is not preferable. If the solution temperature in the reaction vessel exceeds 71° C., the bayerite phase having a large particle diameter appears by deposition, resulting in a small specific surface area, which is not preferable. If pH is less than 8.5, the pore volume of the obtained pseudo-boehmite is decreased, while if pH exceeds 9.5, the bayerite phase having a small specific surface area appears, which is not preferable. It is preferable that the concentration of the reactant to be supplied to the neutralization precipitation vessel is controlled so that the concentration (final concentration) of the formed solid matter (precipitate) is maintained within a range of 1 to 5 moles.

It is desirable that both of the aluminum salt solution and the alkali aluminate solution are simultaneously added when the precipitate is formed by the neutralization, because the precipitate is always generated at identical pH. Preferably, the solution feed time is 6 to 28 minutes. If the solution feed time is less than 6 minutes, then the pore volume of the obtained pseudo-boehmite powder is less than 0.75 cc/g, and the pore volume of the obtained carrier is decreased. On the other hand, if the solution feed time exceeds 28 minutes, then the maximum value of the variation ratio of the pore volume with respect to the pore diameter, which is determined in accordance with the BJH method, exceeds 0.018 cc/g•Å, and the sharp peak, which is not desirable for the pore diameter distribution of boehmite, is consequently generated. More preferably, the solution feed time is 7 to 25 minutes. Further preferably, the solution feed time is about 15 to 25 minutes at about 57° C., 10 to 20 minutes at about 65° C, and 7 to 13 minutes at about 70° C.

It is desirable that the neutralization solution is aged after the formation of the precipitate. The crystalline property of pseudo-boehmite is improved by effecting the aging step. The aging time is not specifically limited. However, the aging time is appropriately within 2 hours. If the aging time is too long, then the pseudo-boehmite particles excessively grow, and the pore volume of pseudo-boehmite is decreased. After the aging is completed, the pseudo-boehmite is separated from the liquid. After the separation, water is used to wash and remove sodium sulfate, sodium chloride or the like as the by-product adhered to the surfaces of the pseudo-boehmite particles, followed by drying by using a drying apparatus such as a spray dryer. The drying temperature is not specifically limited. However, if the drying temperature is too high, the obtained pseudo-boehmite undergoes phase transition to γ-alumina, which is not preferable.

As for the pseudo-boehmite powder thus produced, the pore volume measured by the nitrogen adsorption method, for example, the pore volume concerning pores having a pore diameter of 20 to 600 Å is within a range of 0.75 to 1.8 cc/g, and the maximum value of the variation ratio of the pore volume with respect to the pore diameter is not more than 0.018 cc/g•Å.

When the alumina carrier is produced by using the pseudo-boehmite powder having the pore diameter distribution as described above as a raw material as described later on, then the volume average pore diameter of the alumina catalyst carrier can be easily controlled within a range of 60 to 120 Å, it is possible to easily obtain the alumina catalyst carrier having the (sharp) pore diameter distribution in which the pore volume in the specified range is dominant, and it is possible to suppress the decrease in strength when the alumina catalyst carrier is impregnated with the catalyst metal salt solution.

Explanation will be made below for the operation for producing the alumina catalyst carrier by using the obtained pseudo-boehmite powder. The obtained pseudo-boehmite is mixed and kneaded by using, for example, a kneader. Usually, acid or alkali is added as the peptizing agent during the mixing and kneading process. After that, water is added to obtain an amount of water with which the formation process is effected, followed by mixing and kneading. Those having the ability to peptize the alumina raw material powder are used as the acidic solution and the alkaline solution as described above. Those usable as the acidic solution include, for example, inorganic acids such as nitric acid, sulfuric acid, and hydrochloric acid, and organic acids such as acetic acid, citric acid, and oxalic acid. Especially, nitric acid and organic acids are preferred, because all of them are evaporated in the following calcining step without any residual matter. Those usable as the alkaline solution include, for example, ammonia, quaternary ammonium hydroxides such as tetrapropylammonium hydroxide, sodium hydroxide, potassium hydroxide, and sodium aluminate. Among them, ammonia and quaternary ammonium hydroxides are especially preferred, because they are evaporated in the following calcining step.

When the pseudo-boehmite of the present invention is used, the sharp pore distribution can be formed within the range of the catalyst carrier pore diameter of 60 to 120 Å. The reason of this is considered by the present inventors as follows. For example, if the mixing and kneading step is performed by using the pseudo-boehmite having insufficient peptizing property as explained in the description of the background art, the pseudo-boehmite having a high peak in the vicinity of 40 Å, then the peak in the vicinity of 40 Å remains as it is as compared with the state before the mixing and kneading step, the pores having a size not less than 200 Å are decreased, and another peak appears in the range of 60 to 120 Å. If the mixed and kneaded product having the pore diameter distribution as described above is calcined, a carrier is obtained, which has a bimodal or broad pore diameter distribution. on the other hand, even when the pseudo-boehmite powder of the present invention is used to perform the mixing and kneading step, then the pores having a pore diameter of not less than 200 Å are also decreased, and a sharp peak appears in the range of 60 to 120 Å. However, the peak in the vicinity of 40 Å is originally low. Therefore, only the peak in the range of 60 to 120 Å, which has appeared as a result of the mixing and kneading step, exists as a main peak.

The mixed and kneaded pseudo-boehmite is generally formed to have an appropriate size and shape by using a forming machine. Subsequently, an obtained formed product is dried by using a drying machine, for example, at a temperature of 80 to 150° C. for several tens minutes to overnight, and then it is calcined in a calcining furnace, for example, at a temperature of 400 to 1000° C. Thus, it is possible to obtain the alumina catalyst carrier having the sharp pore diameter distribution in which the pore volume concerning the pore diameter in the specified range is large. The average pore of the alumina catalyst carrier can be arbitrarily adjusted and controlled depending on the type and the concentration of the peptizing agent added during the mixing and kneading step and the mixing and kneading time.

Examples of the method for producing pseudo-boehmite powder according to the present invention will be described below. However, the present invention is not limited thereto.

PRODUCTION OF PSEUDO-BOEHMITE POWDER

Working Example 1

75 liters of water was added to a neutralization precipitation tank having an internal volume of 150 liters, followed by heating so that the water temperature was 57° C.

Subsequently, an aqueous solution of sodium aluminate having a concentration of 1 M heated to 57° C. was fed to the neutralization precipitation tank at a solution feed speed of about 1.8 liter/minute, and an aqueous solution of aluminum sulfate having a concentration of 0.5 M heated to 57° C. was fed to the neutralization precipitation tank. The solution feed speed of the aluminum sulfate aqueous solution was finely controlled so that pH of the mixed solution was 9.0 and constant. Precipitate formation occurred during the feed of the both solutions, while the temperature of the solution during the precipitate formation was maintained at 57° C. The feed of the sodium aluminate aqueous solution and the aluminum sulfate aqueous solution was completed 17 minutes after the start of the feed. Agitation was performed while maintaining the temperature at 57° C. to effect aging for 1 hour. After the aging, an obtained slurry was filtrated and washed to obtain a solid matter. The solid matter was dried by using a spray dryer at inlet/outlet temperatures of 200° C./100° C. to obtain a powder. As a result of the analysis of the dried powder by means of the X-ray diffraction, it was confirmed that the powder was pseudo-boehmite.

The pore volume of the pseudo-boehmite powder thus obtained was measured for respective pore diameter ranges by means of the nitrogen adsorption method. In this measurement, the pore diameter distribution was determined by using measurement results obtained when nitrogen was released, not when nitrogen was adsorbed, at targets of relative pressures of 0.9902, 0.9802, 0.9751, 0.9665, 0.9596, 0.9549, 0.9491, 0.9416, 0.9314, 0.9263, 0.9205, 0.9136, 0.9054, 0.8956, 0.8835, 0.8684, 0.8593, 0.8490, 0.8371, 0.8233, 0.8070, 0.7876, 0.7642, 0.7354, 0.6903, 0.6532, 0.5929, 0.4618, 0.3359, 0.2000, 0.1200, and 0.0550. Obtained results are shown in Table 1.

Table 1 shows the pore volume of pores concerning the pore diameter of 20 to 600 Å and the maximum value of the variation ratio dV/dD of the pore volume (V) determined by the BJH method with respect to the pore diameter (D), together with the solution temperature and pH during the precipitate formation and the precipitation formation time for the sodium aluminate aqueous solution and the aluminum sulfate aqueous solution. In the table, the "precipitate formation time" means the solution feed time for the reaction solution.

Working Example 2

A pseudo-boehmite powder was obtained under the same condition as in Working Example 1 except that the solution temperature during the reaction (precipitate formation) was controlled to be 65° C. Table 1 shows the pore volume of pores concerning the pore diameter of 20 to 600 Å of the obtained pseudo-boehmite powder and the maximum value of the variation ratio dV/dD of the pore volume determined by the BJH method with respect to the pore diameter.

Working Example 3

A pseudo-boehmite powder was obtained under the condition of pH 9.0 in the same manner as in Working Example 1 except that the solution temperature during the reaction (precipitate formation) was controlled to be 70° C., and the solution feed speed was changed to be 3.0 liters/minute so that the solution feed was completed in 10 minutes. Table 1 shows the pore volume of pores concerning the pore diameter of 20 to 600 Å of the obtained pseudo-boehmite powder and the maximum value of the variation ratio of the pore volume determined by the BJH method with respect to the pore diameter.

Working Examples 4 to 6 and Reference Examples 1 to 4

Pseudo-boehmite powders were obtained under the condition of pH 9.0 in the same manner as in Working Example 1 except that the solution temperature during the reaction was controlled to be 57° C., and the solution feed speed was changed to be 0.8 to 6.0 liters/minute so that the solution feed time came to an end at 5 minutes (Reference Example 1), 10 minutes (Reference Example 2), 15 minutes (working Example 4), 20 minutes (Working Example 5), 25 minutes (Working Example 6), 30 minutes (Reference Example 3), and 35 minutes (Reference Example 4) respectively.

The total pore volume of pores concerning the pore diameter of 20 to 600 Å and the variation ratio of the pore volume with respect to the pore diameter were determined by the BJH method in the same manner as in Working Example 1. The relationship between the pore diameter distribution of the pseudo-boehmite powder and the change in solution feed time is depicted in a graph shown in FIG. 11 concerning results obtained in Working Example 4 and Reference Examples 1 and 3. It is understood from the graph that when the solution feed time is 30 minutes, the peak of the variation ratio of the pore volume with respect to the pore diameter concerning pores existing in a pore diameter range of about 40 to 60 Å is extremely sharp, and when the solution feed time is 15 minutes, the maximum value of the variation ratio of the pore volume with respect to the pore diameter is not more than 0.018 (cc/g·Å).

Table 2 shows, together with the reaction condition, the maximum value of the variation ratio of the pore volume with respect to the pore diameter concerning the pore diameter of 20 to 600 Å of the pseudo-boehmite powders obtained in Working Examples 4 to 6 and Reference Examples 1 to 4.

Working Examples 7 to 9 and Reference Examples 5 and 6

Pseudo-boehmite powders were obtained under the condition of pH 9.0 in the same manner as in Working Example 1 except that the solution temperature during the reaction was controlled to be 65° C., and the solution feed speed was 1.2 to 6.0 liters/minute, which was achieved such that the solution feed time came to an end at five kinds of times of 5 minutes (Reference Example 5), 10 minutes (Working Example 7), 15 minutes (Working Example 8), 20 minutes (Working Example 9), and 25 minutes (Reference Example 6). Table 3 shows the pore volume of pores concerning the pore diameter of 20 to 600 Å of the pseudo-boehmite powders obtained by using the respective precipitate formation times and the maximum value of the variation ratio of the pore volume determined by the BJH method with respect to the pore diameter respectively.

Working Examples 10 to 12 and Reference Examples 7 and 8

Pseudo-boehmite powders were obtained by making control so that pH of the mixed solution was 9.0 and constant in the same manner as in Working Example 1 except that the solution temperature during the reaction was controlled to be 70° C., and the solution feed speed of the sodium aluminate aqueous solution was changed (in a range of 1.5 to 6.0 liters/minute) so that the solution feed time came to an end at five kinds of times of 5 minutes (Reference Example 7), 7 minutes (Working Example 10), 10 minutes (Working Example 11), 15 minutes (Working Example 12), and 20 minutes (Reference Example 8). Table 4 shows the pore volume of pores concerning the pore diameter ranging from 20 to 600 Å of the pseudo-boehmite powders obtained in each of Working Examples and Reference Examples and the maximum value of the variation ratio of the pore volume determined by the BJH method with respect to the pore diameter respectively.

Reference Example 9

A pseudo-boehmite powder was obtained by making control so that pH of the mixed solution was 9.0 and constant in the same manner as in Working Example 1 except that the solution temperature during the reaction was controlled to be 53° C., and the solution feed was completed so that the solution feed speed was changed to be 1.5 liter/minute. Table 5 shows the pore volume of pores concerning the pore diameter ranging from 20 to 600 Å of the pseudo-boehmite powder and the maximum value of the variation ratio of the pore volume determined by the BJH method with respect to the pore diameter respectively.

Reference Example 10

A pseudo-boehmite powder was obtained by making control so that pH of the mixed solution was 9.0 and constant in the same manner as in Working Example 1 except that the solution temperature during the reaction was controlled to be 72° C., and the solution feed was completed so that the solution feed speed was changed to be 3.0 liters/minute. Table 5 shows the pore volume of pores concerning the pore diameter range of 20 to 600 Å of the pseudo-boehmite powder and the maximum value of the variation ratio of the pore volume determined by the BJH method with respect to the pore diameter respectively.

Reference Examples 11 and 12

Pseudo-boehmite powders were obtained in the same manner as in Working Example 1 except that the control was made so that the solution feed speed was 1.5 liter/minute and pH of the mixed solution was 8.0 or 9.7 and constant. Table 5 shows the pore volume of pores concerning the pore diameter range of 20 to 600 Å of the pseudo-boehmite powder obtained in each of Reference Examples and the maximum value of the variation ratio of the pore volume determined by the BJH method with respect to the pore diameter respectively.

As clarified from Tables 1 and 2 and the graph shown in FIG. 11, when the solution feed time is not less than 30 minutes at 57° C., then the pore volume concerning those in the range of 20 to 600 Å is small, and the maximum value of the variation ratio of the pore volume with respect to the pore diameter is large (Reference Examples 3 and 4). On the other hand, when the solution feed time is not more than 5 minutes, the powder is obtained in which the pore volume concerning those in the pore diameter range of 20 to 600 Å is extremely small (Reference Example 1).

As clarified from Tables 1 and 3, when the solution feed time is not less than 25 minutes at the solution temperature of 65° C. (Working Examples 7 to 9 and Reference Examples 5 and 6), then the pore volume in the pore diameter range of 20 to 600 Å is small, and the maximum value of the variation ratio of the pore volume with respect to the pore diameter is large (Reference Example 6). On the other hand, when the solution feed time is not more than 5 minutes, the powder is obtained in which the pore volume in the pore diameter range of 20 to 600 Å is small (Reference Example 5).

As clarified from Tables 1 and 4, when the solution feed time is not less than 20 minutes (Reference Example 8) at the solution temperature of 70° C. (Working Examples 10 to 12 and Reference Examples 7 and 8), then the pore volume in the pore diameter range of 20 to 600 Å is small, and the maximum value of the variation ratio of the pore volume with respect to the pore diameter is large. On the other hand, when the solution feed time is not more than 5 minutes (Reference Example 7), the powder is obtained in which the pore volume in the pore diameter range of 20 to 600 Å is small.

In Examples described above, Working Example represents those in which the pseudo-boehmite powder is obtained wherein the pore volume of pores concerning the pore diameter of 20 to 600 Å is within the range of 0.75 to 1.8 cc/g, and the maximum value of dV/dD is not more than 0.018 cc/g•Å. Reference Example represents those in which the pseudo-boehmite powder is obtained wherein the pore volume and the maximum value of dv/dD was not in the foregoing range.

PREPARATION OF ALUMINA CARRIER

The pseudo-boehmite powders obtained in Working Examples 1 to 12 and Reference Examples 1 to 12 were subjected to mixing and kneading in a kneader respectively. Nitric acid was added as a peptizing agent, followed by mixing and kneading to obtain doughs each having a solid concentration of about 50%. Each of the doughs was extruded and formed by using a double arm extruder, followed by drying at 130° C. and calcination at 600° C. for 1 hour to obtain an alumina carrier.

The pseudo-boehmite powders obtained in Working Examples 1 to 3 were used to produce the catalyst carriers for the purpose of desulfurization and denitrification for vacuum gas oil. That is, in the mixing and kneading step for the pseudo-boehmites, the peptizing agent and the mixing and kneading time were regulated to increase the pore volume of the obtained carrier concerning the pore diameter range of 85 to 120 Å. On the other hand, the pseudo-boehmite powders obtained in Working Examples 4 to 9 and Reference Examples 1 to 12 were used to produce the catalyst carriers for the purpose of desulfurization for atmospheric residual oil. That is, in the mixing and kneading step for the pseudo-boehmites, the peptizing agent and the mixing and kneading time were regulated to increase the pore volume of the obtained carrier concerning the pore diameter range of 60 to 90 Å.

The pore volume of the obtained alumina carriers concerning the specified pore diameter ranges (20 to 600 Å, 60 to 90 Å, and 85 to 120 Å) was measured in accordance with the nitrogen adsorption method by using ASAP 2400 produced by Micromeritex. Results of the measurement are shown in Tables 6 to 10.

In order to evaluate the decrease in strength in the step of impregnating the obtained alumina carriers with the catalyst metal solution, thirty individuals of carriers each having a length of not less than 5 mm and a diameter of about 0.79 mm (1/32 inch) were immersed in water to count the number of carriers which were not cracked (water stability). Results of the evaluation are shown in Tables 6 to 10. No crack occurred in the alumina carriers produced by using the pseudo-boehmite powders obtained in Working Examples 1 to 12. However, any crack occurred in approximately the half number of alumina carriers produced by using the pseudo-boehmite powders obtained in Reference Examples 1, 2, 5, 7, 9, and 11. In the tables, the term "central pore diameter" manes the volume average pore diameter.

Figure 12:
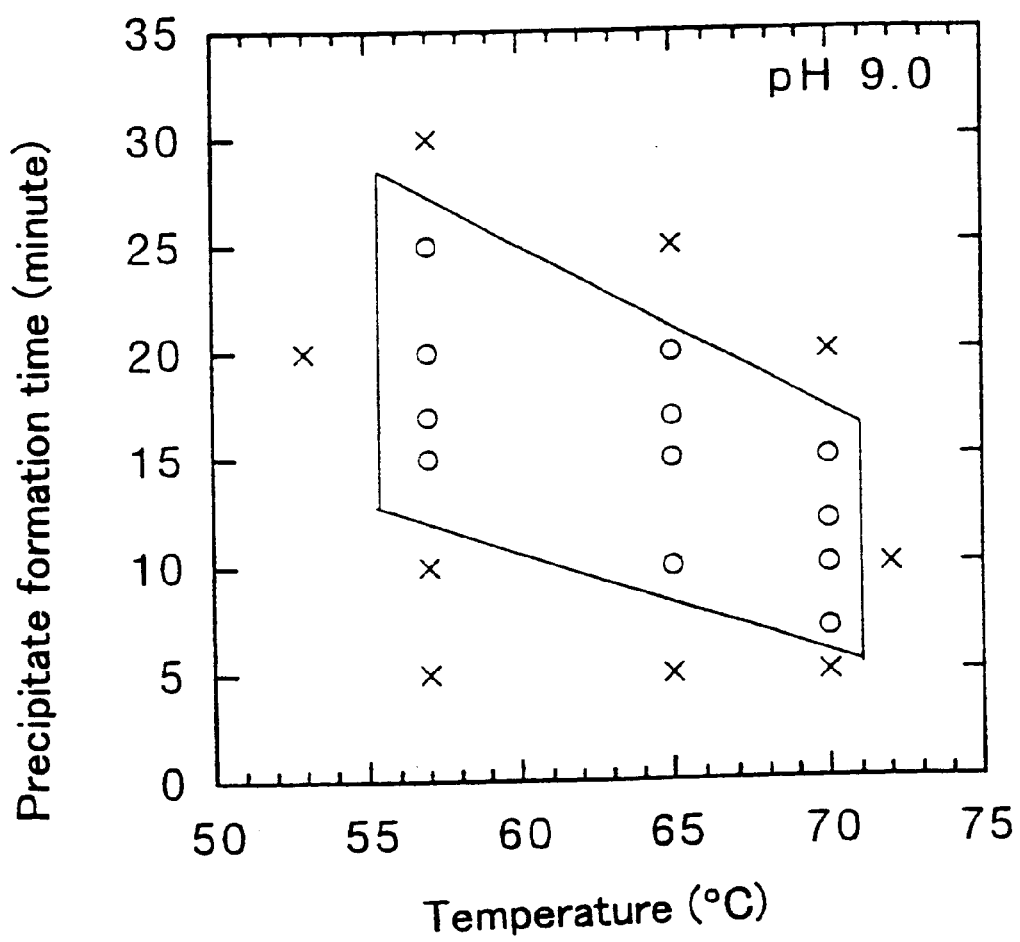
FIG. 12 shows a graph in which the characteristic of the obtained alumina carrier is evaluated for the change in reaction temperature and solution feed time (precipitate formation time) when the pseudo-boehmite as the raw material is prepared.

FIG. 12 shows a graph illustrating the evaluation of the characteristic of the obtained alumina carriers concerning the change in reaction temperature and solution feed time (precipitate formation time in the table) when the pseudo-boehmites as raw materials were prepared. In the graph, the open circle indicates the carrier which exhibits the pore diameter distribution with the sharp peak existing in the pore diameter range of the alumina carrier of 60 to 90 Å or the pore diameter range of 85 to 120 Å and which has good water stability, while the cross indicates the carrier which fails to satisfy any one or both of the pore diameter distribution and the water stability. According to the graph, it is understood that the solution feed time, which is preferable in the neutralization reaction for the pseudo-boehmite as the material for producing the catalyst carrier for hydrogenation refining, is slightly changed depending on the neutralization reaction temperature. Further, it is understood that when the solution feed time and the neutralization reaction temperature are selected in the area surrounded by solid lines in the graph, it is possible to obtain the pseudo-boehmite material powder which is extremely preferable to produce the catalyst carrier for hydrogenation refining.

According to the fact described above, it is understood that the alumina carriers produced from the pseudo-boehmite powders obtained in Working Examples 1 to 3 have the large pore volume in the pore diameter range of 85 to 120 Å and they exhibit the pore diameter distribution having the sharp peak within the foregoing range, and hence they have the pore structure preferable for the catalyst for the desulfurization and the denitrification of atmospheric residual oil. It is understood that the alumina carriers produced from the pseudo-boehmite powders obtained in Working Examples 4 to 9 have the large pore volume in the pore diameter range of 60 to 90 Å and they have the pore diameter distribution with the sharp peak existing within the foregoing pore diameter range, and hence they have the pore structure preferable for the catalyst for the desulfurization and the denitrification of vacuum gas oil. Further, the alumina carriers produced from the pseudo-boehmite powders obtained in Working Examples 1 to 9 have the high water stability, and they undergo less decrease in strength when they are impregnated with the catalyst metal solution.

INDUSTRIAL APPLICABILITY

The pseudo-boehmite powder obtained by the production method according to the present invention has the sharp pore diameter distribution, and it serves as a raw material powder which is extremely preferable to produce the catalyst carrier for hydrogenation refining excellent in water stability. The pseudo-boehmite powder is a material which is preferable, for example, for the catalyst carrier for the purpose of desulfurization and denitrification of the fraction having a boiling point of 200 to 360° C. in the petroleum fraction such as vacuum gas oil, and the catalyst carrier for the purpose of desulfurization of the petroleum fraction having a 50% distillation temperature of not less than 450° C. such as atmospheric residual oil. The alumina catalyst carrier for hydrogenation refining obtained from the pseudo-boehmite powder according to the present invention has the pore diameter and the pore diameter distribution which are most suitable for the hydrogenation refining reaction such as the hydrogenation desulfurization and the denitrification.

Therefore, the catalyst carrier can maintain its catalytic activity for a long period of time.

What is claimed is:

1. A method for producing a pseudo-boehmite powder for a catalyst carrier by effecting a neutralization reaction of a solution of aluminum salt and a solution of alkali aluminate, the neutralization reaction consisting of feeding simultaneously the solution of aluminum salt and the solution of alkali aluminate into a vessel for a feeding time of 6 to 28 minutes while maintaining a temperature of a mixture of the solution of aluminum salt and the solution of alkali aluminate fed in the vessel in a range of 55 to 71° C. and a pH of the mixture in a range of 8.5 to 9.5 in order to precipitate pseudo-boehmite during the feeding time of 6 to 28 minutes.

2. The method according to claim 1, wherein the reaction temperature is within a range of 57 to 70° C., and the solution feed time is within a range of 7 to 25 minutes.

3. The method according to claim 1, wherein the aluminum salt solution is an aluminum sulfate solution, and the alkali aluminate solution is a sodium aluminate solution.

4. The method according to claim 1, wherein a pore volume of the pseudo-boehmite powder with respect to pores having a pore diameter of 20 to 60 Å is within a range of 0.75 to 1.8 cc/g, as measured by a nitrogen adsorption method.

5. The method for producing a pseudo-boehmite powder for a catalyst carrier according to claim 1, wherein the pH of the mixture is in a range of 9.0 to 9.5.

6. A pseudo-boehmite powder, as a material for producing the catalyst carrier, wherein pores each having a pore diameter ranging from 20 to 600 Å have a pore volume within a range of 0.75 to 1.8 cc/g as measured by a nitrogen adsorption method, and a maximum value of variation ratio of the pore volume with respect to the pore diameter is not more than 0.018 cc/g•Å.

7. The pseudo-boehmite powder for the catalyst carrier according to claim 6 wherein the maximum value of variation ratio of the pore volume with respect to the pore diameter is a value obtained by a BJH method.

8. The pseudo-boehmite powder for the catalyst carrier according to claim 6, which is obtained by a neutralization reaction of a solution of aluminum salt and a solution of alkali aluminate, wherein a neutralization reaction temperature is within a range of 55 to 71° C., pH is within a range of 8.5 to 9.5, and a solution feed time for the solution is within a range of 6 to 28 minutes.

9. An alumina catalyst carrier for a hydrogenation refining catalyst, which is produced with the pseudo-boehmite powder as defined in claim 6.

10. The alumina catalyst carrier according to claim 9, wherein pores each having a pore diameter ranging from 20 to 600 Å have a pore volume within a range of 0.5 to 1.0 cc/g, and a pore volume concerning pores having a pore diameter of 60 to 90 Å is within a range of 0.3 to 0.7 cc/g.

11. The alumina catalyst carrier according to claim 10, wherein the pores each having the pore diameter ranging from 20 to 600 Å have the pore volume within the range of 0.5 to 1.0 cc/g, and the pore volume with respect to pores having a pore diameter of 85 to 120 Å is within a range of 0.3 to 0.7 cc/g.

* * * * *